United States Patent
Corbel et al.

(10) Patent No.: US 8,731,463 B2
(45) Date of Patent: May 20, 2014

(54) METHOD FOR CONFIGURING AN ADAPTIVE PROCESSING OF PRIMARY SIGNALS BY THE TRANSMISSION OF SECONDARY SPREAD-FREQUENCY SIGNALING SIGNALS

(75) Inventors: Erwan Corbel, Villeneuve Tolosane (FR); Cédric Baudoin, Toulouse (FR); Mathieu Dervin, Toulouse (FR); Zakariya Faraj, Blagnac (FR)

(73) Assignee: Thales, Neuilly sur Seine (FR)

( * ) Notice: Subject to any disclaimer, the term of this patent is extended or adjusted under 35 U.S.C. 154(b) by 276 days.

(21) Appl. No.: 13/242,007

(22) Filed: Sep. 23, 2011

(65) Prior Publication Data

US 2012/0244797 A1 Sep. 27, 2012

(30) Foreign Application Priority Data

Sep. 24, 2010 (FR) ...................................... 10 03790

(51) Int. Cl.
*H04B 7/185* (2006.01)
(52) U.S. Cl.
USPC ............. 455/12.1; 455/427; 455/17; 370/527
(58) Field of Classification Search
USPC ........... 455/12.1, 427, 428, 17; 710/110, 305, 710/306, 313, 105, 106, 58, 61; 370/207, 370/527, 537, 222, 480, 481, 465
See application file for complete search history.

(56) References Cited

U.S. PATENT DOCUMENTS

| | | | | |
|---|---|---|---|---|
| 4,275,398 | A * | 6/1981 | Parker et al. ................... | 342/463 |
| 6,298,036 | B1 * | 10/2001 | Kaku et al. ..................... | 370/207 |
| 6,732,217 | B1 * | 5/2004 | Nishikido ....................... | 710/306 |
| 7,146,450 | B2 * | 12/2006 | Saitou et al. .................... | 710/306 |
| 2004/0033780 | A1 | 2/2004 | Kelly | |

FOREIGN PATENT DOCUMENTS

| | | |
|---|---|---|
| WO | 01/24408 A2 | 4/2001 |
| WO | 01/24408 A3 | 4/2001 |

OTHER PUBLICATIONS

Castro, Maria Angeles Vazquez et al.: "VoIP cross-layer load control for hybrid satellite-WiMAX networks," IEEE Wireless Communications, IEEE Service Center, Piscataway, NJ, US, vol. 15, No. 3, Jun. 1, 2008, pp. 32-39.

* cited by examiner

*Primary Examiner* — Sujatha Sharma
(74) *Attorney, Agent, or Firm* — Baker & Hostetler LLP

(57) ABSTRACT

A technique for configuring, in real time, an equipment item receiving and processing primary signals which are transmitted to it by satellite link, the technique including transmitting secondary signals with frequencies spread over a band at least partially overlapping a frequency band occupied by the primary signals, the secondary signals including signalling parameters which are used, in real time, by the equipment item to configure processing applied to the primary signals. The technique is applicable to dynamic switching of beams in a multi-beam satellite and to dynamic switching of frames, for example in a time-division multiple access system.

12 Claims, 3 Drawing Sheets

METHOD FOR CONFIGURING AN ADAPTIVE PROCESSING OF PRIMARY SIGNALS BY THE TRANSMISSION OF SECONDARY SPREAD-FREQUENCY SIGNALING SIGNALS

CROSS-REFERENCE TO RELATED APPLICATIONS

This application claims priority to foreign French patent application No. FR 10 03790, filed on Sep. 24, 2010, the disclosure of which is incorporated by reference in its entirety

FIELD OF THE INVENTION

The present invention relates to a method for configuring an adaptive processing of primary signals using the transmission of secondary spread-frequency signals. It applies notably to the dynamic switching of beams in a multi-beam satellite and to the dynamic switching of frames, for example in a time division multiple access system.

BACKGROUND OF THE INVENTION

In a satellite communication system, a station, usually on the ground, transmits a data stream to the payload of the satellite which transmits the data to one or more recipients on the ground using one or more beams. The data are structured in the form of frames, notably to obtain a sharing of the link, for example between a number of users. In this context, a frame is a block of data to be transmitted at a precise instant, on a determined carrier frequency and in a given beam. Also, when the data stream is not organized according to a distribution law that is known in advance and invariable, but contains frames for which the instant of transmission, the destination carrier frequency and/or the destination beam cannot be predicted, the satellite has to dynamically switch the frames. In other words, the satellite must, after having received the frames, determine in real time their transmission parameters and direct them to the appropriate beam.

A first known technique for dynamically switching frames in the satellite is to use a "remote control" type link. A control centre, sometimes referred to by the acronym MCC standing for "Mission Control Centre" transmits the uplink and downlink time/frequency mapping plans to the satellite, which enables the payload to know the frequencies of the carriers, the switching instants and the destination of the frames. However, this technique requires the transmission of a large volume of control data, which is now always in line with the bit rate constraints available on the satellite. This drawback is all the more critical when the switching parameter refresh period is small, or, in other words, when the "dynamism" of the switching is great.

According to a second possible technique, one or more carriers are dedicated to the signalling. In other words, in addition to the primary carrier or carriers which convey the primary signals, a ground station transmits a modulated carrier, on another frequency, dedicated to transporting signalling data. This dedicated carrier is synchronized with the first carrier, and is demodulated by the payload of the satellite to indicate the frequency of the carrier to which the switching must be performed, the switching instants and the destination of the frames. Furthermore, the dedicated carrier may be shared between a number of users according to a TDMA (Time Division Multiple Access) type multiplexing. However, this second technique requires the occupancy of a portion of the frequency spectrum for the signalling data. Furthermore, the number of carriers or the size of the frequency channel occupied by the signalling depends on the number of ground stations in the network.

According to a third technique which can be envisaged, headers are inserted into the frames of the first signals. The payload of the satellite detects these headers which enable the payload to know the switching instants and the destination of the frames. However, this third technique entails modifying an existing, and therefore potentially standardized, wave form by inserting a specific header or by modifying pre-existing header fields (for example, in the case of ATM-type addressing, ATM standing for "Asynchronous Transfer Mode"). Also, this third technique does not allow (or allows only with difficulty) for a transparent switching of the first signals.

SUMMARY OF THE INVENTION

One aim of the invention is to propose a method for performing a signalling on signals transmitted to a receiver, for example a satellite, without affecting the structure of said signals, the occupancy of the spectrum or the useful bit rate. To this end, the subject of the invention is a method for configuring, in real time, an equipment item receiving and processing primary signals which are transmitted to it by satellite link, said method being characterized in that it comprises the transmission of secondary signals with frequencies spread over a band at least partially overlapping the frequency band occupied by the primary signals, said secondary signals comprising signalling parameters which are used, in real time, by said equipment item to configure the processing which is applied to the primary signals.

The method therefore makes it possible to apply, in the equipment item, an adaptive processing, parameterized by information provided by the secondary carrier. Thus, for example, for an equipment item transmitting data via an antenna system, parameters can be inserted into the secondary signals to adjust the gain control of the repeater including the antenna according to the types of data to be transmitted; similarly, the coefficients of a beam-forming network can be modified to adapt the antenna pattern dynamically. The method can also be used to parameterize the dynamic switching of the frames.

According to one implementation of the method according to the invention, the frequency band occupied by the primary signals includes the band occupied by the secondary signals. The secondary signals then notably have the advantage of not occupying additional spectral space relative to the primary signals.

According to one implementation of the method according to the invention, the secondary signals are borne by a carrier frequency spread by a pseudo-random spreading sequence, said carrier being spread over a band that is sufficiently wide not to disturb the decoding of the primary signals, the power spectral density ratio of the primary signals to the secondary signals being sufficiently high to avoid the production of interferences between the primary signals and the secondary signals that would be detrimental to the transmission of the primary signals. The minimum value of this ratio depends on the dimensioning of the system and on the capabilities of the wave form to withstand the interferences.

According to one implementation of the method according to the invention, the carrier subjected to a frequency spreading is, before said spreading, modulated by a signal comprising information symbols. This type of signal is qualified as type II.

According to one implementation of the method according to the invention, the equipment item has to switch, in real time, data frames to different outputs, said frames being contained in said primary signals, said secondary signals comprising signalling parameters, which, when coupled with the primary signals, enable said equipment item to associate an output with each of said frames.

The secondary signals contain meta data concerning the primary signals. These secondary signals evolve in time, in parallel with the primary signals, so that the equipment item receiving the primary signals to be switched can know in real time the switching parameters that apply. The switching can thus be performed transparently, and without affecting either the data rate, or the spectral occupancy. The frames may, for example, be DVB-S2 type frames.

According to one implementation of the method according to the invention, the receiving equipment item is a multi-beam communications satellite, the primary signals and the secondary signals being transmitted from a ground station to said satellite, the switching of the primary signals being performed on board said satellite, in order to direct each frame to one of the beams from said satellite. Without departing from the framework of the invention and according to another implementation of the method, it is a ground station which receives signals to be switched from a satellite. In this case, it is the satellite which produces the secondary signals, the ground station being configured to switch the primary signals using the information contained in these secondary signals.

According to one implementation of the method according to the invention, the signalling parameters comprise, for each frame to be switched:
  the carrier frequency or frequencies on which to send said frame;
  an indication of the output planned for said frame.
The signalling parameters may also comprise additional information, for example in order to configure the frame switching equipment item.

According to one implementation of the method according to the invention,
  either the secondary signals are synchronized with the primary signals;
  or, for each frame to be switched, indications concerning the instants at which the frame must be switched are incorporated in the signalling parameters contained in the secondary signals.

According to one implementation of the method according to the invention, mappings between signalling parameters and frames to be switched are established,
  for each frame of the primary signal, a transmitting device spreads at least one carrier frequency by a spreading sequence which depends on the signalling parameters to be applied to said frame, in order to generate said secondary signals;
  said mappings are transmitted, via a communication link, to the equipment item that has to switch the frames;
  in said equipment item:
    finding, by correlation with the spreading sequence transmitted to the satellite in said mappings, the sequence that was used to frequency-spread the secondary signals, the secondary signals being unspread by using said spreading sequence to extract the signalling parameters;
    using the signalling parameters to switch the frames of the primary signals.

According to one implementation of the method according to the invention, the primary signals are borne by one or more carrier frequencies, a pseudo-random spreading sequence for each {carrier frequency for the primary signals, destination beam} pairing being used, the pseudo-random sequences being orthogonal.

Also the subject of the invention is a frame switching device installed on board a multi-beam satellite, said device comprising at least one receiving antenna capable of receiving primary signals comprising frames to be switched and secondary signals with frequencies spread over a band at least partially overlapping the band occupied by said first signals, the secondary signals comprising switching signalling parameters, characterized in that it comprises a switching module fed by a module for extracting signalling parameters from the spread secondary signals, and by a configuration module storing the mappings between spreading sequences and switching parameters, the switching module being adapted to direct the frames of the primary signals to the beam designated in said signalling parameters.

BRIEF DESCRIPTION OF THE DRAWINGS

Other features will become apparent from reading the detailed description which follows given as a nonlimiting example, in light of the appended drawings which represent.

DETAILED DESCRIPTION

Figure 1:
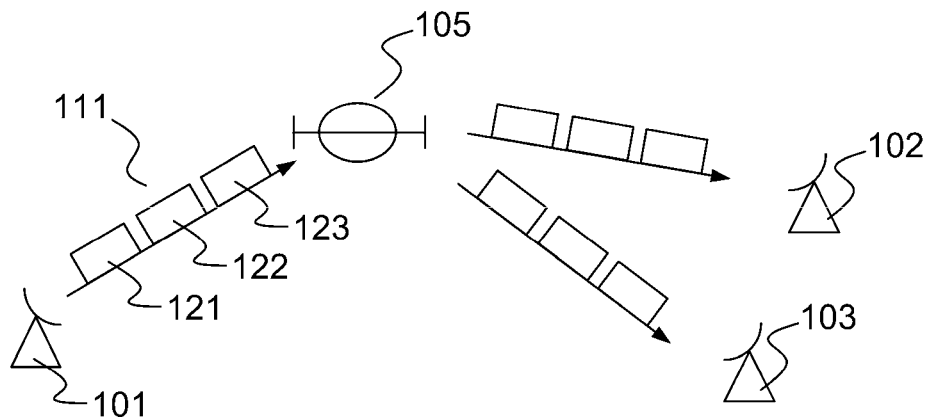
FIG. 1, an exemplary satellite communications system having to perform beam switching.

FIG. 1 shows an exemplary satellite communications system having to perform a beam switching. The system of the example comprises three ground stations 101, 102, 103 and a satellite 105. A first station 101 sends signals 111 to the satellite 105. These signals 111 comprise a series of frames 121, 122, 123, of which some have to be transmitted to the second station 102 and others to the third station 103. The satellite 105 must therefore, at precise instants, switch the signals 111 received on a given beam, and on a given carrier, so that all the frames reach the planned recipient. The method according to the invention makes it possible to perform this switching without the abovementioned drawbacks of the prior art.

Similarly, a communication system used, for example, to handle the switching of bursts to one or more distinct areas, has to have a payload which assigns, at precise instants, the frames making up the signals that it receives on a determined carrier frequency, and possibly on a determined beam, if the recipient users are situated in distinct areas.

Figure 2A:
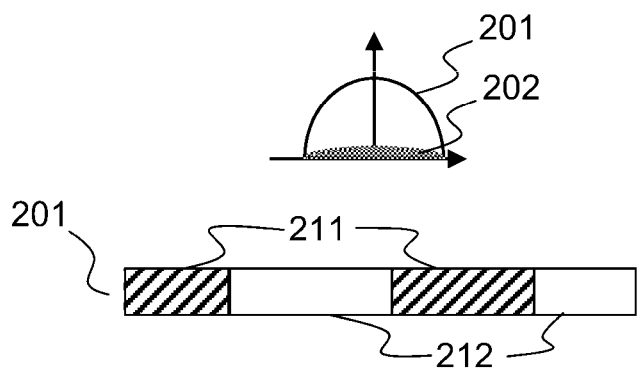
FIG. 2a, a diagram showing the distribution of the signal frames to be switched in the case where these signals are borne by a single frequency.

FIG. 2a is a diagram showing the distribution of the signal frames to be switched in the case where these signals are borne by a single frequency.

A first carrier transporting signals to be switched, called "primary signals", is schematically represented by a first power spectral density curve 201. This first carrier transports the primary signals in the form of a set of frames. The term "frame" should be understood to be a block of data, the size of which is not necessarily fixed, and that has a determined destination area. As an illustration, a switching frame may correspond to a set of frames of DVB-S2 (Digital Video Broadcasting—2nd generation) type or to a set of pulses on the return channel of a DVB-RCS (Digital Video Broadcasting—Return Channel via Satellite") system. In the example of FIG. 2a, a first subset of frames 211 is intended to be transmitted to a first area, and a second subset of frames 212 is intended to be transmitted to a second area. The satellite receiving the primary signals therefore has to switch the frames 211, 212 of these signals to the beam covering the appropriate destination area.

For the switching to each of the areas to be done correctly, the method according to the invention transmits signalling data via a secondary carrier, represented by a second curve 202, and the power spectral density of which is very much lower than the power spectral density of the primary carrier. For example, the power spectral density difference is equal to −20 dB at the maximum point, so as to avoid any interference between the signals to be switched and the signalling signals, called "secondary signals". Advantageously, the secondary carrier covers a frequency band included in the frequency band covered by the primary carrier, so that no additional spectral occupancy is required for the transmission of the signalling signals. Advantageously, the secondary carrier covers a frequency band included in the frequency band covered by the primary carrier, such that no supplementary spectral occupancy is required to transmit signalling signals. The secondary carrier can be spread, for example, by multiplication with a pseudo-random sequence, sometimes called PN, standing for "Pseudo-Noise".

The primary signals to be switched and the secondary signalling signals are intimately linked. In other words, the primary signals cannot be transmitted correctly to the recipients without the secondary signals, and the secondary signals are pointless without the primary signals. The payload of the satellite receives both the primary signals and the secondary signals, the latter being unspread to be able to decode the signalling information relating to the signals to be switched.

Figure 2B:
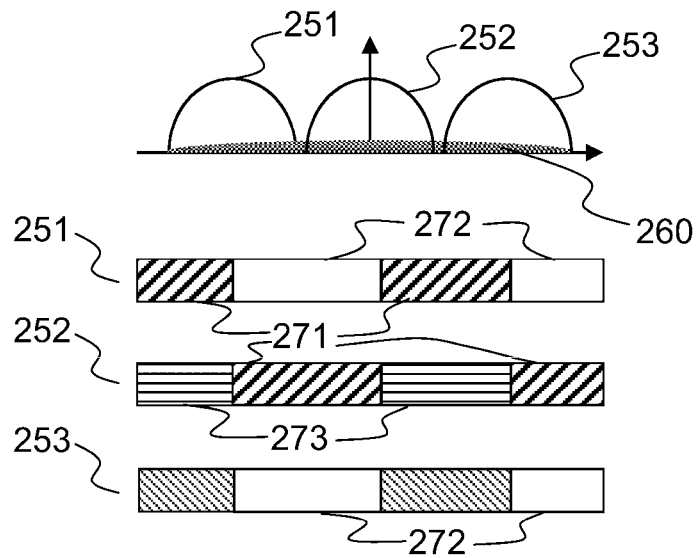
FIG. 2b, a diagram showing the distribution of the signal frames to be switched in the case where these signals are borne by a number of distinct frequencies.

FIG. 2b is a diagram showing the distribution of the signal frames to be switched in the case where these signals are transmitted on a number of distinct carriers. In the example of FIG. 2b, three primary carriers 251, 252, 253 are used to transmit the signals to be switched. A secondary carrier 260, spread over the frequency band occupied by the three primary carriers, comprises the signalling signals that are used to switch the frames contained in the signals transmitted on the primary carriers. In the example, the set of the three carriers comprises frames to be switched to four different beams. The first primary carrier 251 comprises an alternation of frames 271, 272 intended respectively for the first beam and for the second beam. The second primary carrier 252 comprises an alternation of frames 273, 271 intended for the third beam and for the first beam, and the third primary carrier 253 comprises an alternation of frames 274, 271 intended for the fourth beam and for the first beam.

Figure 3:
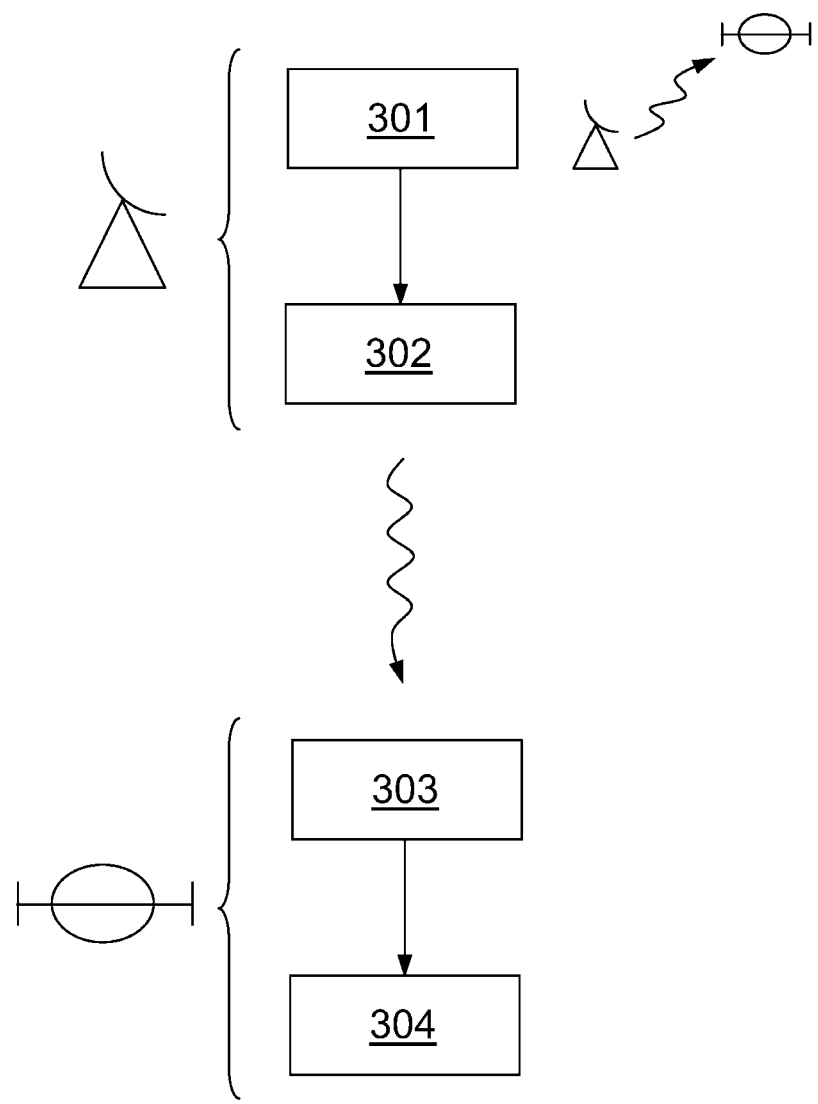
FIG. 3, a block diagram illustrating the steps of an exemplary method according to the invention.

FIG. 3 shows a block diagram illustrating the steps of an exemplary method according to the invention used to perform the beam switching. In the example, the signals are sent from the ground to a satellite, which performs the switching of the primary signals. According to another implementation of the method according to the invention, the signals are sent by a satellite towards a terrestrial station, which directs the primary signals, for example to a number of recipients on the ground.

Initially 301, primary signal transmission parameters are set for each type of frame. For example, for each recipient, a carrier frequency is assigned to it together with the destination area in which it is located. These transmission parameters are communicated to the satellite, for example, via a remote control-type link. The satellite stores these parameters which it will need to switch the signals.

In the case of the switching of frames or bursts, a frequency plan is distributed to all the ground stations by a controller to indicate the slots available on each beam coverage.

Secondly 302, the spread-frequency secondary signals are generated in relation to the primary signals. A number of modulation types can be employed to generate the secondary signals.

According to one implementation of the method according to the invention, the signalling signals are of type I. In this case, the spread secondary signals are obtained, for example, by modulating a pure carrier using a pseudo-noise sequence, a different sequence being assigned to each set of parameters, a set of parameters being, in the example, a {primary carrier, beam} pairing. The sequences used must be orthogonal and consequently constitute signatures of the modulated carriers. The mappings between the sequences and the {primary carrier, beam} pairings are transmitted to the satellite, for example by the abovementioned remote control link, the satellite storing these mappings. Thus, for the type I signalling signals, by virtue of the stored mappings, simply knowing the sequence used to modulate the carrier is sufficient for the satellite to determine the switching parameters to be applied to the frames concerned. The sequence can be considered as a signature from which the set of parameters can be retrieved.

According to another implementation of the method according to the invention, the signalling signals are of type II. In this case, the secondary signals are obtained by spreading, over a wider spectrum using a pseudo-noise sequence, a modulated carrier containing information symbols. The information symbols contain, for example:

a reference word to help in determining the starts of frames;
    time stamp information concerning the start and end of the next frame intended for the same beam as the current frame; and possibly
    other information specific to the configuration of the payload of the satellite, for example the destination of a frame or the control laws that have to be applied by a beam forming network, whether digital or analogue; in the case where the switching module comprises a digital beam forming network, the weight sequences for each beam can be transmitted.

As an illustration, starting from the following assumptions:
    the signalling signals are sent with a power 20 dB less than that of the primary signals,
    the signalling signals are received at least 5 dB above the thermal noise at the foot of the satellite antenna, and
    the C/N threshold for the detection of the sequences or the demodulation threshold is 7 dB, the signalling signals can be spread with a spreading of the order of a factor of 1000, that is to say 30 dB. If the duration of a frame to be switched is 100 ms and if 1000 information bits are sent each time, then the useful bit rate is 10 kb/s in 10 kHz and the spreading band is 10 MHz. This value is compatible, for example, with the size of a DVB-S2 carrier or with the band allocated to a spot for a DVB-RCS-type system.

The ground station which sends the signalling signals has to know:
    the sequences associated with the {carrier, beam} pairings,
    the frame start instants (at the access layer level),
    the synchronization on the symbol rate of the carrier (at the physical layer level).

Furthermore, the signals, whatever their type, can be spread over the spectral space occupied by a single carrier (see FIG. 2a) or the spectral space occupied by a number of carriers (see FIG. 2b). In the case where the secondary signal is spread over the spectrum occupied by a number of carriers of the primary signal, the use of a different pseudo-random sequence for each primary carrier makes it possible to separate the carriers.

Moreover, the secondary signals can be synchronized with the primary signals, so that the frame starts (that is to say, the instants at which new switching parameters must be applied) are implicitly defined by the moments of arrival of the secondary signals. Alternatively, the secondary and primary signals, even if they are not totally asynchronous, are not perfectly synchronized. In this latter case, and for the type II signals, time stamp information must be incorporated in the secondary signals, so as to determine the starts and ends of frames to apply the set of parameters planned for each of the frames.

The secondary signals are thus generated continuously in time in relation to the primary signals, then they are sent simultaneously with the primary signals by the ground station to the multi-beam satellite.

In the case of the switching of frames or bursts, each ground station can send signalling signals to inform the payload of the satellite of the destination of its frames.

Thirdly 303, the receiving equipment item which, in the example, is the payload of a satellite, extracts the signalling information contained in the secondary signals, as and when the primary and secondary signals are received. This information, extracted in real time, contains the parameters that can be applied to switch the frames contained in the primary signals.

By virtue of the sequences stored in the payload, the sequence or sequences used to code the switching parameters are found by correlation. Once the sequence or sequences has/have been found, they are used to unspread the secondary signal and decode the switching parameters.

In the case where the secondary signal is spread over the spectrum occupied by a number of carriers of the primary signal, the use of a pseudo-random sequence for each primary carrier makes it possible to separate the carriers. The sequences follow one another with a frame rate higher than that of the primary carriers. The secondary signals are unspread then demodulated on board the satellite. The unspreading makes it possible to use the time stamp information contained in the information symbols (for the type II secondary carriers). Optionally, a block correcting code is used to lower the demodulation threshold.

Fourthly 304, the satellite applies, in real time, the switching parameters extracted previously to the primary signals to direct them to the appropriate outputs. The term "output" should be understood, for example, to be an antenna port, or, if an active antenna is used, a certain distribution of the weights assigned to the different radiant elements of the antenna to send in the desired direction.

Figure 4:
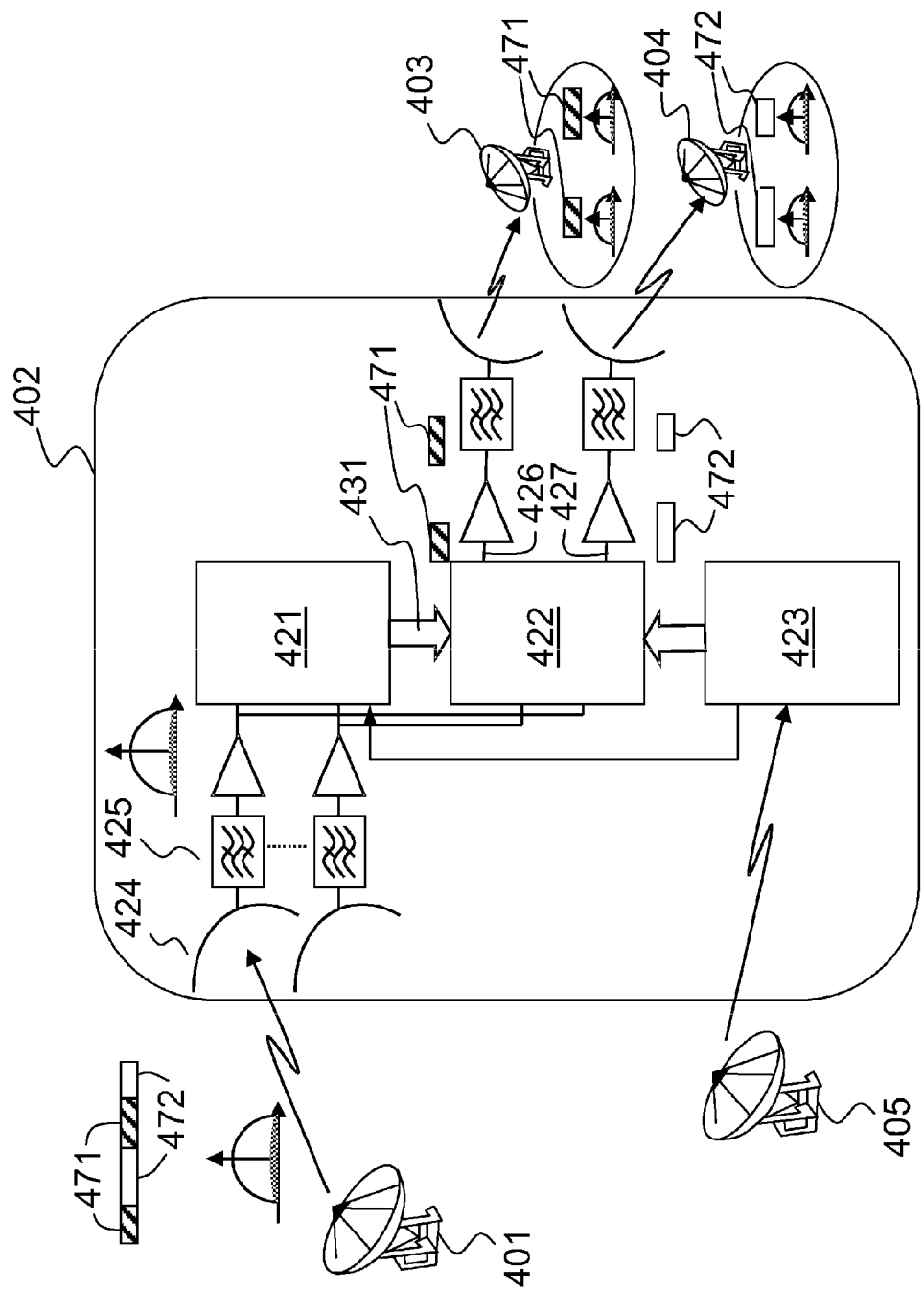
FIG. 4, an exemplary architecture of a system implementing the method according to the invention.

FIG. 4 shows an exemplary architecture of a system implementing the method according to the invention, in the case of the beam switching.

The system comprises a first ground station 401 sending signals to a satellite 402, which switches the received signals to a second station 403 situated in a first area on the ground or a third station 404 situated in a second area on the ground.

The satellite 402 comprises a signal extraction module 421, a switching module 422 and a configuration module 423.

The first ground station 401 sends:
primary signals comprising frames intended alternately for the second ground station 403 and the third ground station 404; and signalling signals frequency spread with a different pseudo-random sequence for each beam.

The configuration module 423 on board the satellite is used notably to store the pseudo-random sequences (codes) used to frequency-spread the signalling signals. A different pseudo-random sequence is assigned to each beam, the sequences being, advantageously, orthogonal. The mappings between pseudo-random sequences and beams are transmitted from the ground to the satellite, for example, by a remote control-type link, a configuration station on the ground 405 indicating said mappings to the switching module 422.

The signals sent by the first ground station 401—in other words, the primary signals and the signalling signals—are received via an antenna 424 feeding a filtering and amplification subsystem 425. The signals are duplicated at the output of this subsystem, then transmitted both to the signal extraction module 421 and to the switching module 422. The signal extraction module 421 comprises, for example, a bank of correlators when the signalling signals are of type I, or a bank of correlators and a demodulator if the signalling signals are of type II.

The bank of correlators uses the sequences stored by the configuration module 423 to determine, by correlation with the received signals, the sequence or sequences that have been used to spread the secondary signal. During the correlation processing performed on board the satellite, a buffer memory is used to store the primary signals while the frame starts are being determined. Advantageously, the extraction of the type I signalling is carried out using digital technologies, the use of the buffer memory generally requiring a digital processing. The extraction of the signalling could be carried out using analogue technologies. The extraction of the type II signalling uses digital technologies, the switch on board the satellite being able to be analogue or digital.

The signal extraction module 421 applies the appropriate sequence to the received signals to unspread the secondary signals and determine the frame starts. The switching parameters extracted from the unspread signals are transmitted to the switching module 422, which at the same time receives the primary signals. In parallel, the mappings 432 between pseudo-random sequences and beams stored in the configuration module 423 are transmitted to the switching module 422.

Provided with the signalling information 431 and the mappings 432, the switching module 422 can route the primary signals intended for different beams to the corresponding antenna ports 426, 427. According to one embodiment of the system, the transmitting antenna included in the payload to transmit the frames to the destination areas is an active antenna which operates by applying different phase shifts to a number of radiant elements. The switching module 422 in the case of the beam switching may be, for example, a DTP (digital transparent processor) or a digital beam forming network (DBFN) if an active antenna is envisaged.

In the example of FIG. 4, the frames 471 intended for the second ground station 403 are shown shaded, whereas the frames 472 intended for the third ground station 404 are represented in white.

According to one implementation of the method according to the invention, the secondary signals comprise configuration information that can be used, for example, to configure the sending power or other parameters specific to the payload receiving the secondary signals. For example, parameters that can be used to set the operating point of the amplifiers can be transmitted in the secondary signal to modify the configuration during a determined time (corresponding, for example, to the transmission of certain frames).

The method according to the invention includes a number of advantages. Notably, it does not modify the definition of the wave form of the primary signals—in other words, the method is transparent—, it does not require a high bit rate link of remote control type synchronized with the primary signals. Furthermore, when the band over which the signalling signals are spread is included in the frequency band occupied by the primary signals, implementing the method does not require any frequency resource dedicated solely to the signalling. Moreover, the method does not modify the channelling on board the satellite.

We claim:

1. A method which configures, in real time, an equipment item receiving and processing primary signals which are transmitted to it by satellite link, the method comprising:
   transmitting secondary signals with frequencies spread over a band at least partially overlapping a frequency band occupied by the primary signals, the secondary signals including signalling parameters which are used, in real time, by the equipment item to configure processing applied to the primary signals, wherein:
   the secondary signals are borne by a carrier which is frequency spread by a pseudo-random spreading sequence, the carrier being spread over a band that is sufficiently wide so as not to disturb the decoding of the primary signals; and
   the power spectral density ratio of the primary signals to the secondary signals is sufficiently high to avoid production of interference between the primary signals and the secondary signals detrimental to the transmission of the primary signals.

2. The method according to claim 1, wherein the frequency band occupied by the primary signals includes the band occupied by the secondary signals.

3. The method according to claim 1, wherein the carrier subjected to the frequency spreading is, before said spreading, modulated by a signal comprising information symbols.

4. A method which configures, in real time, an equipment item receiving and processing primary signals which are transmitted to it by satellite link, the method comprising:
   transmitting secondary signals with frequencies spread over a band at least partially overlapping a frequency band occupied by the primary signals, the secondary signals including signalling parameters which are used, in real time, by the equipment item to configure processing applied to the primary signals; and
   switching by the equipment item, in real time, data frames to different outputs, the data frames being included in the primary signals; wherein
   the secondary signals comprise signalling parameters which are used in real time by the equipment item to associate an output with each of the data frames.

5. The method according to claim 4, wherein
   the equipment item is a multi-beam communications satellite;
   the primary signals and the secondary signals are received by the satellite from a ground station; and
   the switching of the primary signals is performed on board said satellite, in order to direct each data frame to one of the beams from said satellite.

6. The method according to claim 4, wherein
for each data frame to be switched, the signalling parameters comprise:
   the carrier frequency or frequencies on which to transmit the data frame; and
   an indication of the output planned for the data frame.

7. The method according to claim 4, wherein
the secondary signals are either
   synchronized on the primary signals; or
   for each data frame to be switched, indications concerning times at which the data frame must be switched are incorporated in the signalling parameters included in the secondary signals.

8. The method according to claim 4, further comprising:
   establishing mappings between signalling parameters and data frames to be switched;
   spreading, for each data frame of the primary signal, a carrier frequency by a spreading sequence which depends on the signalling parameters to be applied to the data frame, in order to generate the secondary signals;
   transmitting said mappings, via a communications link, to the equipment item switching the data frames;
   finding in the equipment item, by correlation with the spreading sequence transmitted to the satellite in the mappings, the spreading sequence that was used to frequency-spread the secondary signals;
   unspreading the secondary signals in the equipment item by using the spreading sequence to extract the signalling parameters; and
   using the signalling parameters in the equipment item to switch the data frames of the primary signals.

9. The method according to claim 4, wherein
   the primary signals are borne by one or more carrier frequencies; and
   a pseudo-random spreading sequences are orthogonal for each pairing of carrier frequency for the primary signals and destination beam being used.

10. A frame switching device installed on board a multi-beam satellite, the device comprising:
   a receiving antenna capable of receiving primary signals including frames to be switched and secondary signals with frequencies spread over a band at least partially overlapping a band occupied by the first signals, the secondary signals including switching signalling parameters;
   a switching module fed by a module for extracting the signalling parameters from the spread secondary signals, the switching module being adapted to direct the frames of the primary signals to a beam designated in the signalling parameters; and
   a configuration module which stores mappings between spreading sequences and switching parameters.

11. The method according to claim 1, wherein the frequency band occupied by the primary signals includes the band occupied by the secondary signals.

12. The method according to claim 4, wherein the frequency band occupied by the primary signals includes the band occupied by the secondary signals.

* * * * *